(12) United States Patent
Cano Coscia et al.

(10) Patent No.: US 10,549,393 B2
(45) Date of Patent: Feb. 4, 2020

(54) ROTARY BASE FOR SECURING TOOLS TO A WORK TABLE

(71) Applicant: Universidad Nacional de Itapua, Ciudad Encarnacion-Itapua (PY)

(72) Inventors: Eugenio Jose Cano Coscia, Ciudad Cambyreta-Itapua (PY); Cinthia Tatiana Prendeski Stolaruk, Ciudad Encarnacion-Itapua (PY); Valeria Maria Elizabeth Cuadra Fensterseifer, Ciudad de Hohenau-Itapua (PY); Julian Marcelo Lischuk Baran, San Juan del Parana-Itapua (PY)

(73) Assignee: UNIVERSIDAD NACIONAL DE ITAPUA, Ciudad Encarnacion-Itapua (PY)

( * ) Notice: Subject to any disclaimer, the term of this patent is extended or adjusted under 35 U.S.C. 154(b) by 0 days.

(21) Appl. No.: 16/030,576

(22) Filed: Jul. 9, 2018

(65) Prior Publication Data

US 2019/0366496 A1 Dec. 5, 2019

(30) Foreign Application Priority Data

Jun. 5, 2018 (PY) .................................. P 1842735

(51) Int. Cl.
*B23Q 3/02* (2006.01)
*B23Q 1/26* (2006.01)
(52) U.S. Cl.
CPC ................. *B23Q 3/02* (2013.01); *B23Q 1/26* (2013.01)

(58) Field of Classification Search
USPC ............................ 248/652; 269/22, 296, 309
See application file for complete search history.

(56) References Cited

U.S. PATENT DOCUMENTS

| 1,901,120 | A |   | 3/1933  | Rankin  |            |
|-----------|---|---|---------|---------|------------|
| 3,578,799 | A | * | 5/1971  | Davis   | B23Q 3/06  |
|           |   |   |         |         | 269/296    |
| 3,729,185 | A |   | 4/1973  | Roeske  |            |
| 3,938,798 | A | * | 2/1976  | Solie   | B23Q 3/108 |
|           |   |   |         |         | 269/20     |
| 4,205,834 | A | * | 6/1980  | Demuth  | B23F 23/12 |
|           |   |   |         |         | 269/258    |
| 4,396,186 | A | * | 8/1983  | Solie   | B23Q 3/108 |
|           |   |   |         |         | 269/310    |
| 4,410,169 | A | * | 10/1983 | Swenson | B25B 5/087 |
|           |   |   |         |         | 269/138    |

(Continued)

*Primary Examiner* — Monica E Millner
(74) *Attorney, Agent, or Firm* — Lucas & Mercanti, LLP

(57) ABSTRACT

Rotary base for securing tools to a work table with a cylindrical support base and truncated upper end, in whose interior and concentric thereto, there is a threaded lower cover and a cylindrical base piston and with a truncated upper end with means to secure tools. The base piston is arranged on the threaded lower cover and is vertically displaced on this threaded lower cover through the interior of the support base, actuated by a lifting system between a lower unlocking position in which the base piston rotates freely around its axis with respect to the support base and an upper locking position in which the rotation of the base piston with respect to the support base is locked by means of friction of its truncated upper end against the truncated upper end of the support base.

8 Claims, 1 Drawing Sheet

(56) References Cited

U.S. PATENT DOCUMENTS

| | | | | |
|---|---|---|---|---|
| 4,445,675 | A | * | 5/1984 | Kitaura ................... B25B 5/061 269/20 |
| 4,743,001 | A | * | 5/1988 | Craft ..................... B23B 31/302 269/22 |
| 4,854,532 | A | * | 8/1989 | Trovato ............... F16M 11/041 248/176.3 |
| 4,934,672 | A | * | 6/1990 | Craft ..................... B23B 31/305 269/22 |
| 5,400,844 | A | * | 3/1995 | Pollock ..................... B25B 1/22 144/286.1 |
| 5,713,564 | A | * | 2/1998 | Schindler ............... B23Q 3/108 269/309 |
| 5,957,443 | A | * | 9/1999 | Mascola ................ B23Q 3/108 269/22 |
| 6,186,567 | B1 | * | 2/2001 | Blick ..................... B23Q 1/032 294/194 |
| 8,141,482 | B2 | * | 3/2012 | Schaltegger ......... B21D 28/002 100/219 |
| 8,672,103 | B2 | * | 3/2014 | Tatsuda ................ B23Q 16/105 184/48.2 |
| 8,770,567 | B2 | * | 7/2014 | Piggott ................... B23B 39/06 269/266 |
| 2003/0071405 | A1 | * | 4/2003 | Miksovsky ............... B25B 1/22 269/95 |
| 2010/0219574 | A1 | * | 9/2010 | Stark ................... B23Q 1/0072 269/309 |
| 2010/0308524 | A1 | * | 12/2010 | Kitaura ............... B23Q 1/0081 269/309 |

* cited by examiner

ROTARY BASE FOR SECURING TOOLS TO A WORK TABLE

CROSS REFERENCE TO RELATED APPLICATION

This application claims priority of Paraguay Application No. P 1842735 PY filed Jun. 5, 2018, application which is incorporated herein by reference.

FIELD OF THE INVENTION

The present invention belongs to the technical field of manufacturing, specifically to the machining of pieces, and more specifically to the means for fixing various tools, such as presses, lathes, drills, mills, cutting tools, tightening tools, etc., to a work table. The invention relates in particular to a rotary base for securing tools to a work table which allows the rotation of the tool to reach different positions. Said rotary base therefore has an unlocking position in which a base piston, on which the tool is fixed, rotates freely around its axis and a locking position in which the rotation of the base piston is locked by friction of said base piston on a support.

BACKGROUND OF THE INVENTION

It is known that the securing of presses and other tools to a work table involves physical force and in addition rotating these tools to change the position of the tool has limitations in rotational angles in the majority of the devices.

To overcome these difficulties, the current solutions incorporate mechanisms which have the drawback of requiring complicated pumping elements to secure them, such as is shown in document U.S. Pat. No. 3,729,185A.

Alternatively, other solutions have mechanical fasteners by means of screws or jaws as is shown in document U.S. Pat. No. 1,901,120A which have the drawback that the screws and gripping and securing means, with use over time, end up loosening which involves period maintenance.

A rotary base for securing tools of any type to a work table is therefore desirable which securely fixes the tool and enables the rotation of the same so that it can operate in different positions, avoiding the drawbacks of the previous systems existing in the prior art.

DESCRIPTION OF THE INVENTION

The present invention solves the problems existing in the prior art by means of a rotary base for securing tools of any type to a work table.

The proposed invention has a vertical cylindrical support base which has a truncated upper end, the support base being configured to be fixed to the work table. In the interior of said support base, and centric thereto, there is a threaded lower cover fixed to the interior of the support base and a cylindrical base piston and with a truncated upper end which has means to secure tools. The base piston is arranged on the threaded lower cover and is vertically displaced on this threaded lower cover through the interior of the support base, actuated by a lifting system. The displacement carried out by the base piston is between a lower unlocking position, in which the base piston rotates freely around its axis with respect to the support base, and an upper locking position, in which the rotation of the base piston with respect to the support base is locked by means of friction of its truncated upper end against the truncated upper end of the support base.

According to a particular embodiment of the invention, the lifting system is a hydraulic system formed by a hydraulic fluid which flows between the threaded lower cover and the base piston, vertically displacing the base piston with respect to the support base, between the lower unlocking position and the upper locking position. The hydraulic fluid is actuated by an actuation plunger which is, in turn, displaced in a cylinder connected to the support base in whose interior the hydraulic fluid is located which is pressurized by the same, when actuated by a threaded knob.

According to this embodiment, the base piston can rotate in the interior of the concentric support base joined to the work table, provided the system is not pressurized, consequently in this case the system remains unlocked.

To obtain the fixing of the position of the tool by means of locking the rotary base, it is sufficient for the user to actuate the threaded knob which moves the actuation plunger along the cylinder of the actuation plunger and pressurizes the interior of the support base by means of the hydraulic fluid, displacing the base piston which ascends slightly and is locked by friction of its truncated upper end against the truncated upper end of the support base.

To carry out the inverse operation, that is to say, to release the base piston to unlock the rotation and be able to rotate the tool, it is sufficient for the user to loosen the threaded knob by means of which the plunger depressurizes the interior of the support base, causing the descent of the base piston and with it its unlocking.

Preferably, the rotary base object of the present invention can have seal rings in different areas to ensure the watertightness of the hydraulic fluid, preventing leaks and guaranteeing effective functioning over time. There may be seal rings for example on the exterior lateral surface of the base piston, between the lower cover and the support base, in the joint of the cylinder of the actuation plunger to the support base or on the exterior lateral surface of the actuation plunger.

In particular, the support base has a peripheral wing with through-holes to be fixed to the work table.

In addition, the means for securing tools to the base piston can particularly be threaded perforations arranged at its truncated upper end.

The object of the present invention constitutes a rotary base for securing tools to a work table which provides 360° absolute freedom of rotation to the tool by means of rotation of the base, maintaining the horizontal rotational plane completely parallel to the work table or any other installation surface and has a hydraulic fastening actuated by a simple threaded knob or screw which requires minimal force by the operator and provides firm securing of the tool.

BRIEF DESCRIPTION OF THE DRAWINGS

To better understand the invention, an embodiment of the invention will be described below in an illustrative, but non-limiting manner, which makes reference to a series of figures.

Figure 1:
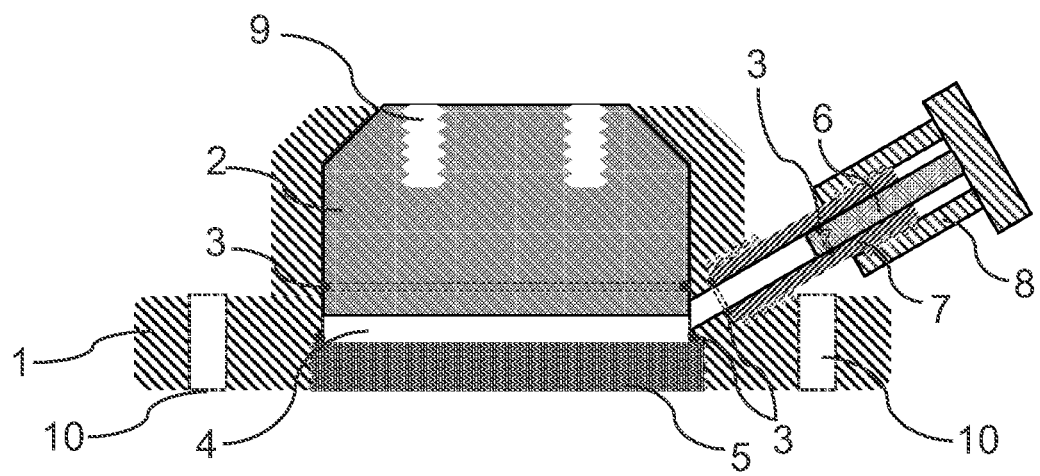
FIG. 1 is a sectional elevation of an embodiment of a rotary base for securing tools to a work table object of the present invention.
Figure 2:
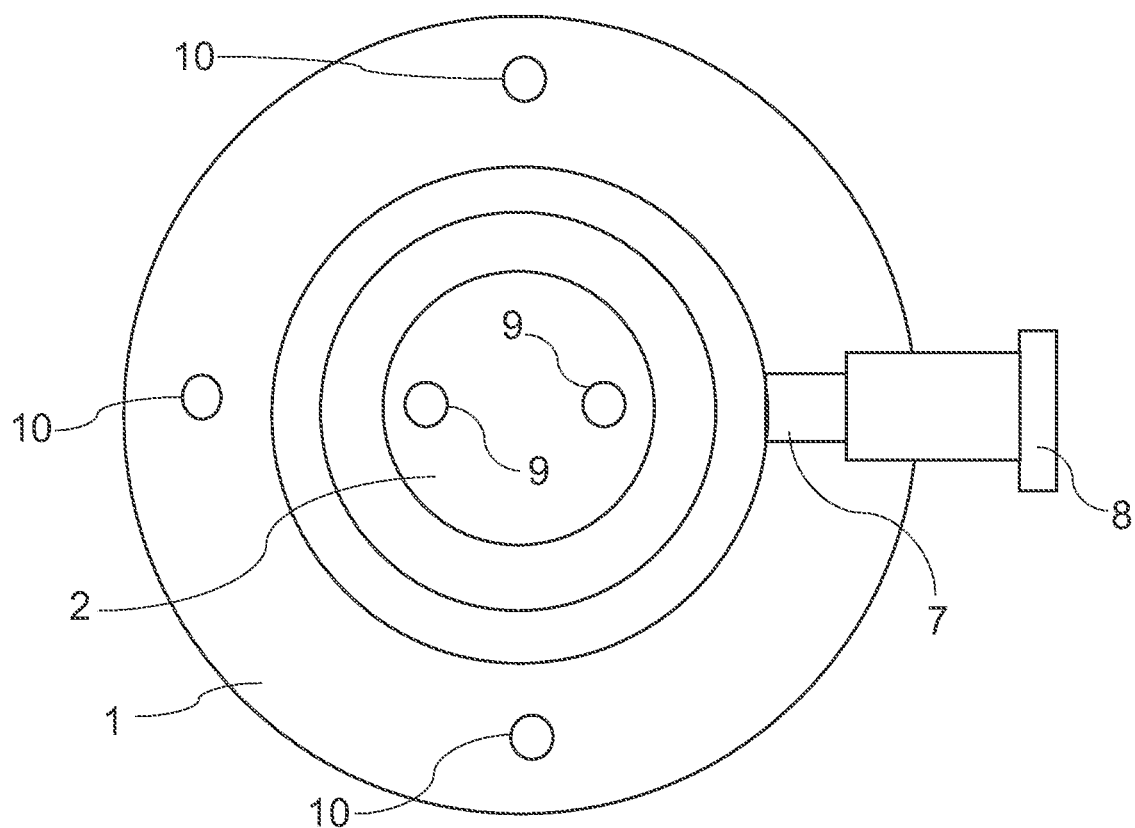
FIG. 2 is a plan view of the rotary base of FIG. 1.

In these figures, reference is made to a set of elements which are:
1. support base
2. base piston
3. seal rings
4. hydraulic fluid
5. threaded lower cover
6. actuation plunger
7. cylinder of the actuation plunger
8. threaded knob
9. threaded perforations of the base piston
10. through-holes of the support base

DETAILED DESCRIPTION OF THE INVENTION

The object of the present invention is a rotary base for securing tools to a work table.

As is shown in the figures, the rotary base object of the present invention has a vertical cylindrical support base 1 which has a truncated upper end and a lower peripheral wing with a plurality of through-holes by means of which the rotary base is fixed to the work table. In the interior of said support base 1, and arranged centric thereto, there is a threaded lower cover 5 fixed to the interior of the support base 1 and a cylindrical base piston 2 which has a truncated upper end with means to secure tools of any type for example presses, lathes, drills, mills, cutting tools, tightening tools, etc. The base piston 2 is arranged on the threaded lower cover 5 and is vertically displaced on this threaded lower cover through the interior of the support base 1, actuated by a lifting system. The vertical displacement moves the base piston 2 between a lower unlocking position, in which the base piston 2 rotates freely around its axis with respect to the support base 1, and an upper locking position in which the rotation of the base piston 2 with respect to the support base 1 is locked by means of friction produced between its truncated upper end against the truncated upper end of the support base 1 when the base piston 2 is lifted slightly with respect to the support base 1.

According to a preferred embodiment of the invention, the lifting system is a hydraulic system formed by a hydraulic fluid 4 contained between the threaded lower cover 5 and the base piston 2 such that the base piston 2 vertically displaces with respect to the threaded lower cover 5 between the lower unlocking position and the upper locking position. The hydraulic fluid 4 is actuated by an actuation plunger 6 which is displaced in a cylinder 7 connected to the support base 1 through whose interior the hydraulic fluid 4 is pressurized. This hydraulic fluid 4 is driven through the interior actuation plunger 6 to the cylinder 7 which is actuated by a threaded knob 8.

Preferably, the rotary base object of the present invention can have different seal rings 3 in different areas to ensure the water-tightness of the hydraulic fluid, preventing leaks and ensuring effective operation over time. There may be different seal rings 3, for example on the exterior lateral surface of the base piston 2 between the lower cover 5 and the support base 1, in the joint of the cylinder 7 of the actuation plunger 6 to the support base 1 or on the exterior lateral surface of the actuation plunger 6.

According to a particular embodiment of the invention, the support base 1 has a lower peripheral wing with through-holes 10 to be fixed to the work table.

In addition, the means for securing tools to the base piston 2 can particularly be threaded perforations 9 arranged at its truncated upper end.

The invention claimed is:

1. A rotary base for securing tools to a work table which comprises:
   a vertical cylindrical support base having a first truncated upper end configured to be fixed to the work table and in whose interior, and concentric thereto are arranged
     a threaded lower cover fixed to the interior of the support base, and
     a cylindrical base piston having a second truncated upper end, the second truncated upper end having means to secure tools to the cylindrical base piston,
   wherein the cylindrical base piston is arranged on the threaded lower cover and configured to be vertically displaced on said threaded lower cover through the interior of the support base, actuated by a lifting system between
     a lower unlocking position in which the cylindrical base piston rotates freely around its axis with respect to the support base, and
     an upper locking position in which the rotation of the cylindrical base piston with respect to the support base is locked by means of friction of the second truncated upper end against the first truncated upper end of the support base.

2. The rotary base for securing tools to a work table according to claim 1, wherein the lifting system is a hydraulic system which comprises:
   a hydraulic fluid contained between the threaded lower cover and the base piston vertically displacing the base piston with respect to the threaded lower cover, said hydraulic fluid
     actuated by an actuation plunger which is displaced, in turn, in a cylinder connected to the support base in whose interior the hydraulic fluid is contained and is driven through an interior actuation plunger to the cylinder and is actuated by a threaded knob.

3. The rotary base for securing tools to a work table according to claim 2, wherein at least one seal ring is arranged on an exterior lateral surface of the cylindrical base piston.

4. The rotary base for securing tools to a work table according to claim 1, wherein a seal ring is arranged in a joint of the support base and the threaded lower cover.

5. The rotary base for securing tools to a work table according to claim 2, wherein a seal ring is arranged in a joint of the cylinder of the actuation plunger and the support base.

6. The rotary base for securing tools to a work table according to claim 2, wherein a seal ring is arranged on an exterior lateral surface of the actuation plunger.

7. The rotary base for securing tools to a work table according to claim 1, wherein the support base comprises a lower peripheral wing with a plurality of through-holes configured to be fixed to the work table.

8. The rotary base for securing tools to a work table according to claim 1, wherein the means for securing tools of the base piston comprise a plurality of threaded perforations arranged at its truncated upper end.

* * * * *